(12) United States Patent
Groag (10) Patent No.: US 12,485,704 B2
(45) Date of Patent: Dec. 2, 2025

(54) TUBELESS TIRE DEVICE AND KIT

(71) Applicant: IG Cycling Innovation Ltd, MaAnit (IL)

(72) Inventor: Itay Groag, MaAnit (IL)

(73) Assignee: IG Cycling Innovation Ltd, MaAnit (IL)

( * ) Notice: Subject to any disclaimer, the term of this patent is extended or adjusted under 35 U.S.C. 154(b) by 394 days.

(21) Appl. No.: 17/925,884

(22) PCT Filed: May 18, 2021

(86) PCT No.: PCT/IL2021/050568
§ 371 (c)(1),
(2) Date: Nov. 17, 2022

(87) PCT Pub. No.: WO2021/234692
PCT Pub. Date: Nov. 25, 2021

(65) Prior Publication Data
US 2023/0182514 A1 Jun. 15, 2023

Related U.S. Application Data

(60) Provisional application No. 63/027,742, filed on May 20, 2020.

(51) Int. Cl.
*B60C 5/02* (2006.01)
*B60C 5/00* (2006.01)
(Continued)

(52) U.S. Cl.
CPC .............. *B60C 5/02* (2013.01); *B60C 5/004* (2013.01); *B60C 5/04* (2013.01); *B60C 19/127* (2013.01);
(Continued)

(58) Field of Classification Search
CPC ....... B60C 2200/12; B60C 5/00; B60C 5/004; B60C 5/02; B60C 5/04; B60C 5/10;
(Continued)

(56) References Cited

U.S. PATENT DOCUMENTS 2,913,035 A 11/1959 Lapin et al.
3,024,831 A * 3/1962 Mcconkie ............ B60C 25/145
152/511

(Continued)

FOREIGN PATENT DOCUMENTS

DE 202012013014 6/2014
DE 102017214454 2/2019
WO WO 2021/234692 11/2021

OTHER PUBLICATIONS

Pure Cycles ("Presta vs Schrader: What's this valve?", pp. 1-6, Feb. 22, 2017). (Year: 2017).*

(Continued)

*Primary Examiner* — Sedef E Paquette (57) ABSTRACT

The present invention relates to a device for mounting tubeless tire comprising an elongated balloon having an opening attached to a bicycle tire valve. The balloon is fabricated from latex or any other suitable elastic material, and is filled with a tire sealant composition. Further, the ballon is designed to burst at a pressure of 15-40 psi.

13 Claims, 13 Drawing Sheets

(51) Int. Cl.
*B60C 5/04* (2006.01)
*B60C 19/12* (2006.01)
*B60C 25/01* (2006.01)
B29C 73/16 (2006.01)
B29D 30/06 (2006.01)

(52) U.S. Cl.
CPC ............ *B60C 25/01* (2013.01); *B29C 73/166* (2013.01); *B29D 2030/0687* (2013.01); *B60C 2200/12* (2013.01)

(58) Field of Classification Search
CPC ....... B60C 19/12; B60C 19/127; B60C 29/02; B60C 29/04; B60C 29/062; B29D 30/0685; B29D 2030/0686; B29D 2030/0687; B29D 2030/0698
USPC ............................ 156/394.1, 421.2; 152/195
See application file for complete search history.

(56) References Cited

U.S. PATENT DOCUMENTS

| | | | |
|---|---|---|---|
| 2005/0257869 A1 | 11/2005 | Rumbaugh | |
| 2008/0121461 A1 | 5/2008 | Gross et al. | |
| 2009/0266464 A1 | 10/2009 | Boulain | |
| 2010/0108217 A1* | 5/2010 | Bradke | B60C 29/007 152/427 |
| 2011/0248552 A1* | 10/2011 | Koshiyama | B60B 21/104 301/58 |
| 2012/0074763 A1* | 3/2012 | Chan | B60B 1/044 301/58 |
| 2014/0113072 A1 | 4/2014 | Meyer | |
| 2015/0013919 A1* | 1/2015 | Yates | B60C 25/145 157/1.2 |
| 2015/0102657 A1* | 4/2015 | Hed | B60B 21/025 301/95.104 |
| 2018/0333996 A1 | 11/2018 | Canfield | |
| 2018/0370305 A1 | 12/2018 | Krefting | |

OTHER PUBLICATIONS

Supplementary European Search Report and the European Search Opinion Dated May 16, 2024 From the European Patent Office Re. Application No. 21807961.4. (7 Pages).

International Preliminary Report on Patentability Dated Dec. 1, 2022 From the International Bureau of WIPO Re. Application No. PCT/IL2021/050568. (8 Pages).

International Search Report and the Written Opinion Dated Aug. 18, 2021 From the International Searching Authority Re. Application No. PCT/IL2021/050568. (10 Pages).

Communication Pursuant to Article 94(3) EPC Dated Dec. 13, 2024 From the European Patent Office Re. Application No. 21807961.4. (5 Pages).

* cited by examiner

TUBELESS TIRE DEVICE AND KIT

RELATED APPLICATIONS

This application is a National Phase of PCT Patent Application No. PCT/IL2021/050568 having International filing date of May 18, 2021, which claims the benefit of priority under 35 USC § 119(e) of U.S. Provisional Patent Application No. 63/027,742 filed on May 20, 2020. The contents of the above applications are all incorporated by reference as if fully set forth herein in their entirety.

BACKGROUND

The present invention relates to a device and kit for mounting a tubeless tire on a wheel. Embodiments of the present invention relate to an inflatable balloon for mounting a tubeless bicycle tire while simultaneously delivering a sealant into the tire.

Historically, inflatable tires on bicycles have used an air tight inner tube for tire inflation. In the last two decades, the bicycle industry started shifting to tubeless tire wheel setups that forgo the use of an inner tube but require specially-designed rims and tires and the use of a sealant.

The tubeless tire setup has dramatically reduced tire failures due to punctures and pinch flats and has been quickly adopted by riders and rim and tire manufacturers. However, mounting of a tubeless tire on a rim and filling it with a sealant can be time consuming, messy and difficult and oftentimes requires use of a high pressure, high volume pump or compressor.

There is thus a need for, and it would be highly advantageous to have, a device and kit that can be used to easily and rapidly mount a tubeless tire while simultaneously filling it with a sealant.

SUMMARY

According to one aspect of the present invention there is provided a device for mounting a tubeless tire comprising an elongated balloon having an opening attached to a bicycle tire valve.

According to embodiments of the present invention the balloon is designed to burst at a pressure of 15-40 psi.

According to embodiments of the present invention the balloon is filled with a tire sealant composition.

According to embodiments of the present invention when inflated within a tire, the balloon elongates and then expands radially to push a bead of the tire against a rim.

According to embodiments of the present invention the balloon elongates to encircle at least 30% of the tire.

According to embodiments of the present invention the valve is a Presta or Schrader valve.

According to embodiments of the present invention the balloon is fabricated from latex or any other suitable elastic material.

According to embodiments of the present invention the balloon is covered with a lubricant.

According to embodiments of the present invention the lubricant is liquid silicone.

According to embodiments of the present invention the lubricant is a dry lubricant.

According to another aspect of the present invention there is provided a kit for mounting a tubeless tire comprising the device and an applicator containing a latex-disintegrating composition.

According to embodiments of the present invention the latex-disintegrating composition includes D-limonene.

According to embodiments of the present invention the applicator is a spray bottle.

According to another aspect of the present invention there is provided method of mounting a tubeless tire comprising mounting a device having a bicycle tire valve attached to a balloon between a tire and rim; inflating the balloon through the bicycle tire valve until the balloon bursts; and continuing to inflate the tire through the valve until a desired pressure is reached.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE SEVERAL VIEWS OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION

The present invention is of a device and kit which can be used to mount a tubeless tire. Specifically, the present invention can be used to mount a tubeless bicycle tire easily and rapidly while optionally delivering a sealant into the tire.

The principles and operation of the present invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

Tubeless tire setups have become the de facto standard in mountain, gravel and even road cycling. While tubeless tires provide numerous benefits to riders they are oftentimes difficult and time consuming to setup.

While reducing the present invention to practice, the present inventor has devised an approach for mounting tubeless tires that does not require a high pressure air source such as a compressor and can be easily carried both at home and on the trail/road. As is further described herein, the present approach utilizes a unique device that includes a balloon fitted with a bicycle tire valve. When inflated, the balloon elongates within the tire to cover 30% or more of the circumference. Following elongation, the balloon radially expands to push the tire bead against the rim. Further inflation ruptures/pops the balloon and provides an instantaneous burst of air that seat the tire bead in place. The tire can then be further inflated to a desired pressure.

Referring now to the drawings, FIGS. 1-8 illustrate embodiments of the present device that is referred to herein as device 10. Device 10 is suitable for mounting of any tire on any size rim. In the case of bicycles, typical tire diameters are 26, 27.5 and 29 inches and typical tire widths range from 20-80 mm.

Figure 1:
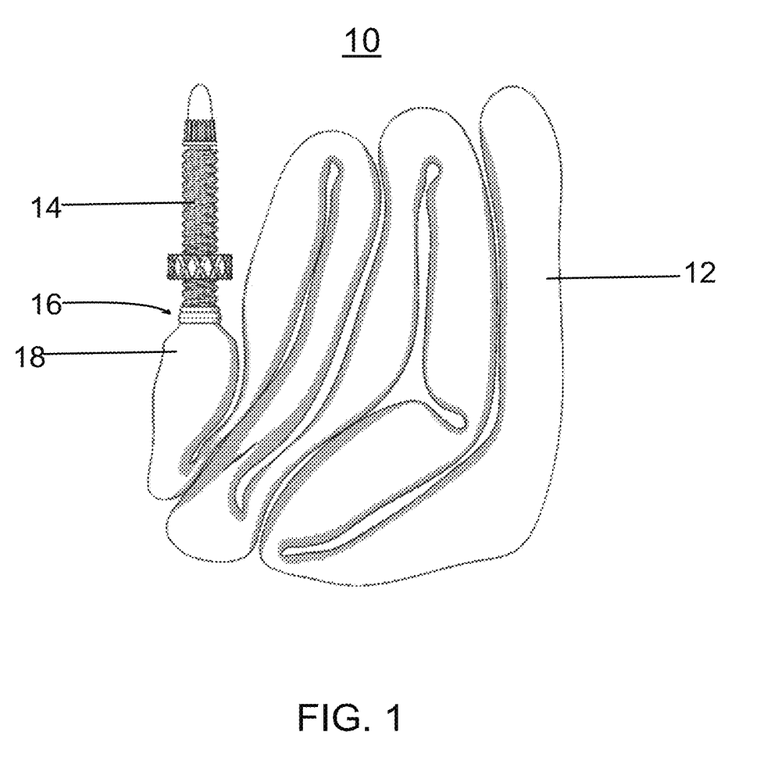
FIGS. 1 and 2 illustrate embodiments of the present device in a folded pre-inflated state.
Figure 2:
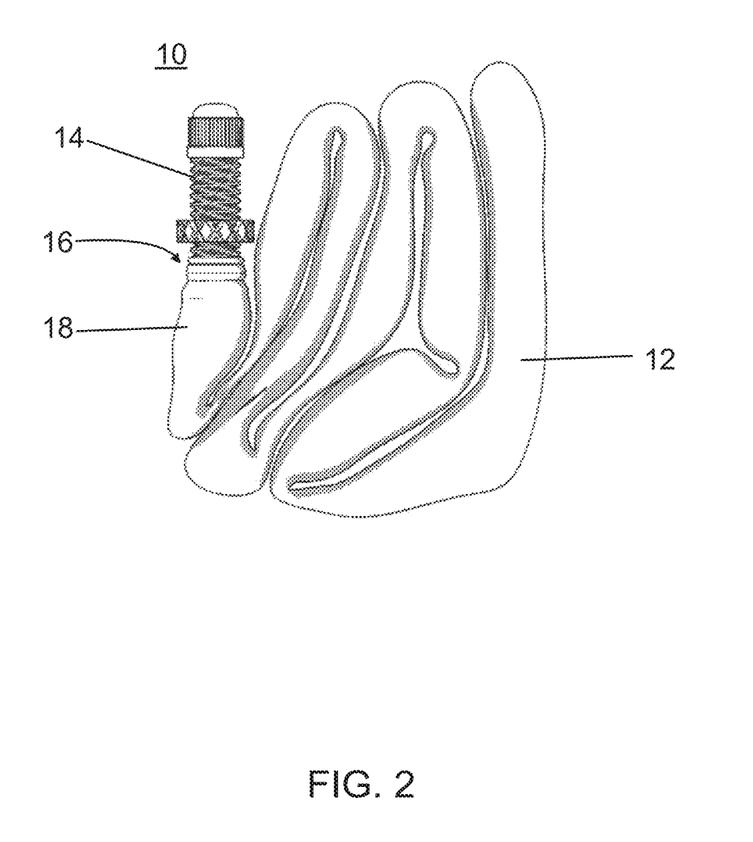
Figure 4:
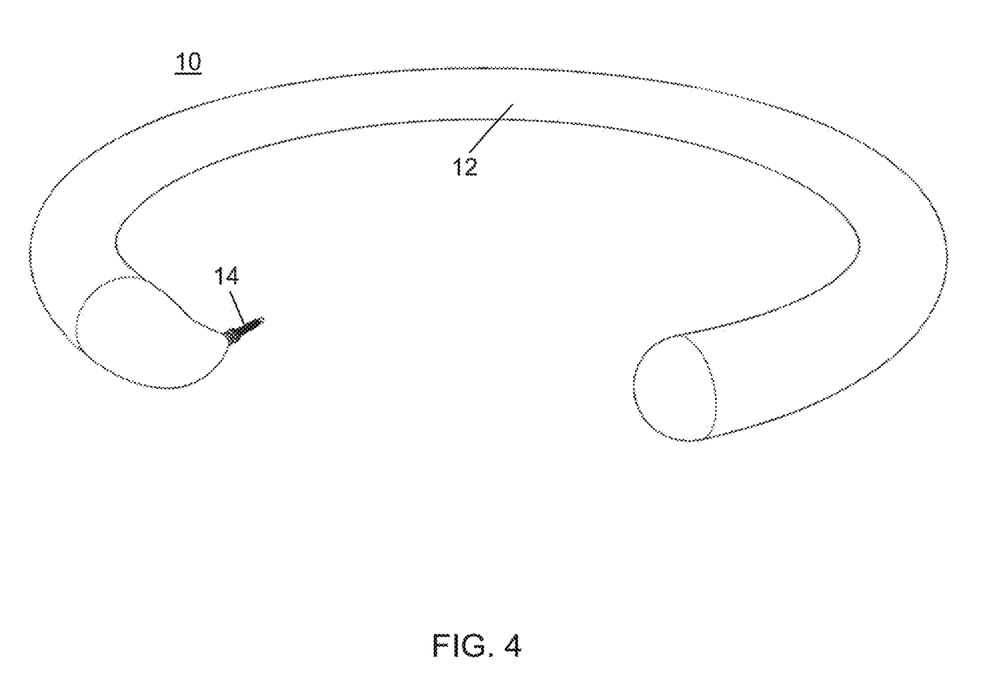
FIG. 4 illustrates an inflated in-tire state of one embodiment of the present device (tire and rime not shown).
Figure 5:
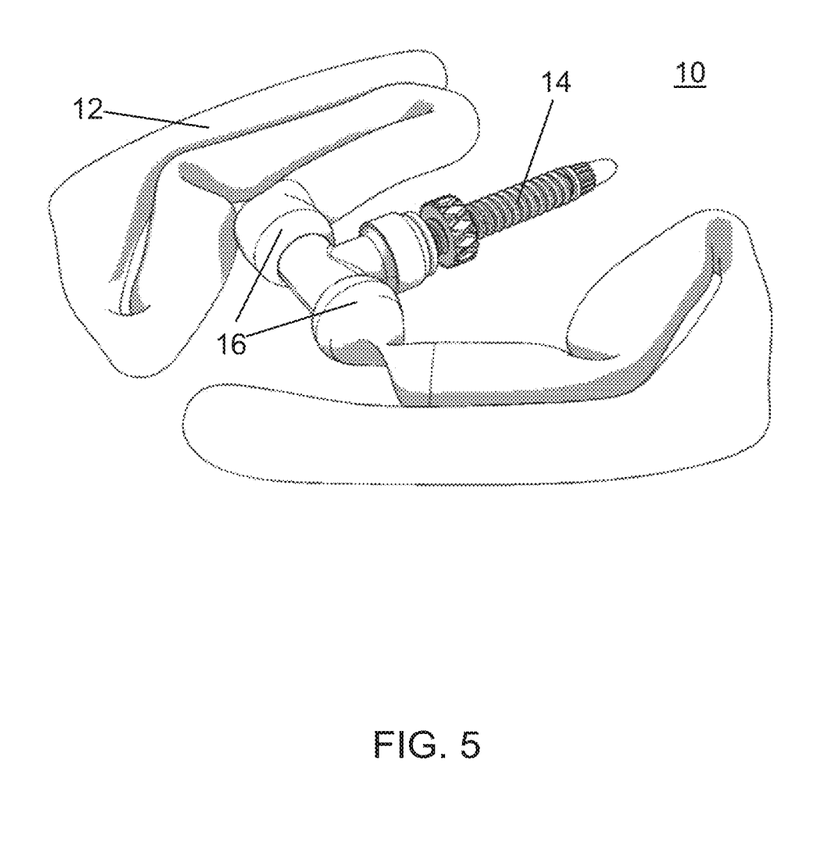
FIG. 5 illustrates another embodiment of the present device.
Figure 6:
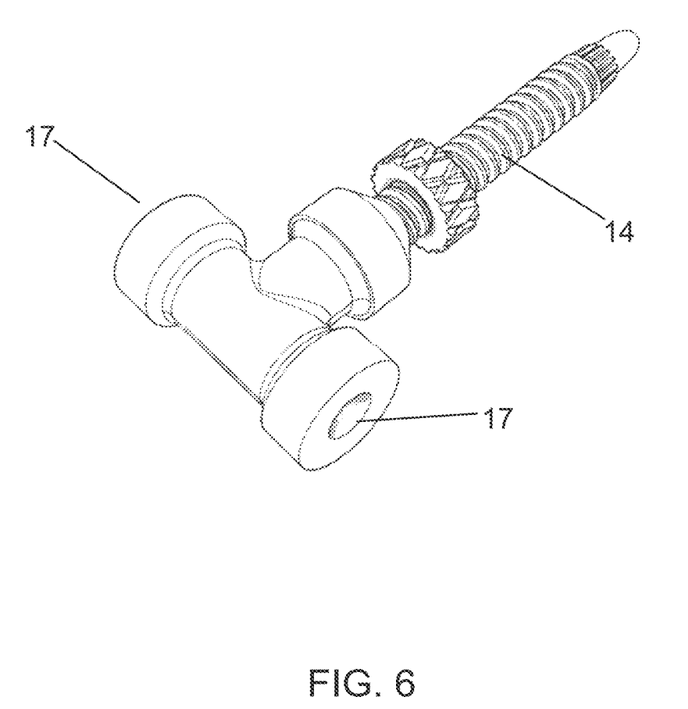
FIG. 6 illustrates a valve of the embodiment shown in FIG. 5.
Figure 7:
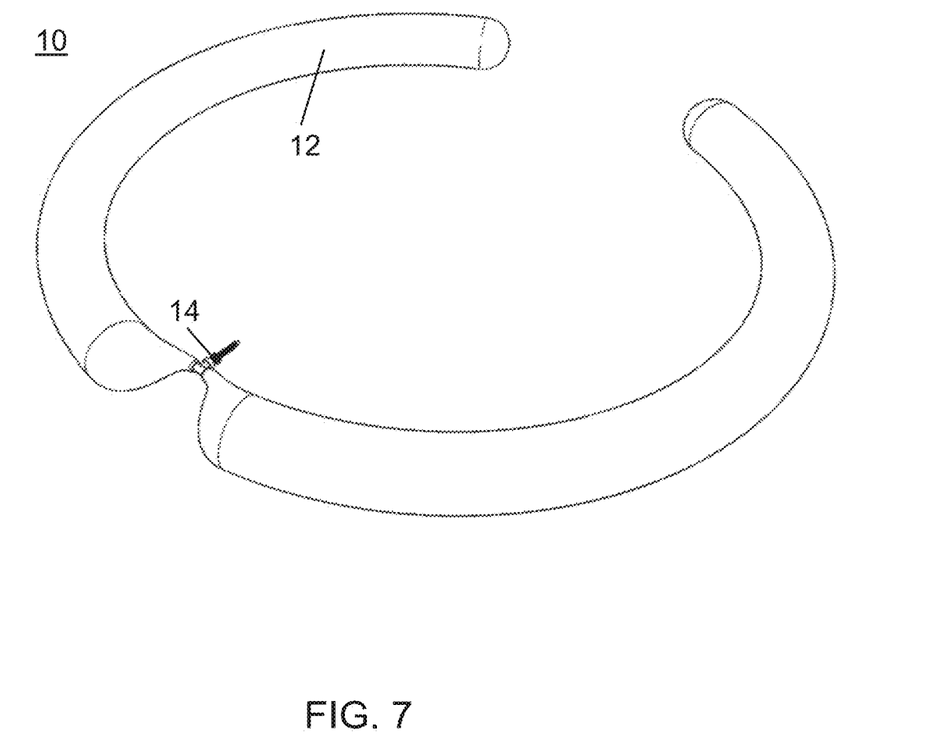
FIG. 7 illustrates the inflated in-tire state of the device shown in FIG. 5 (tire and rime not shown).
Figure 10:
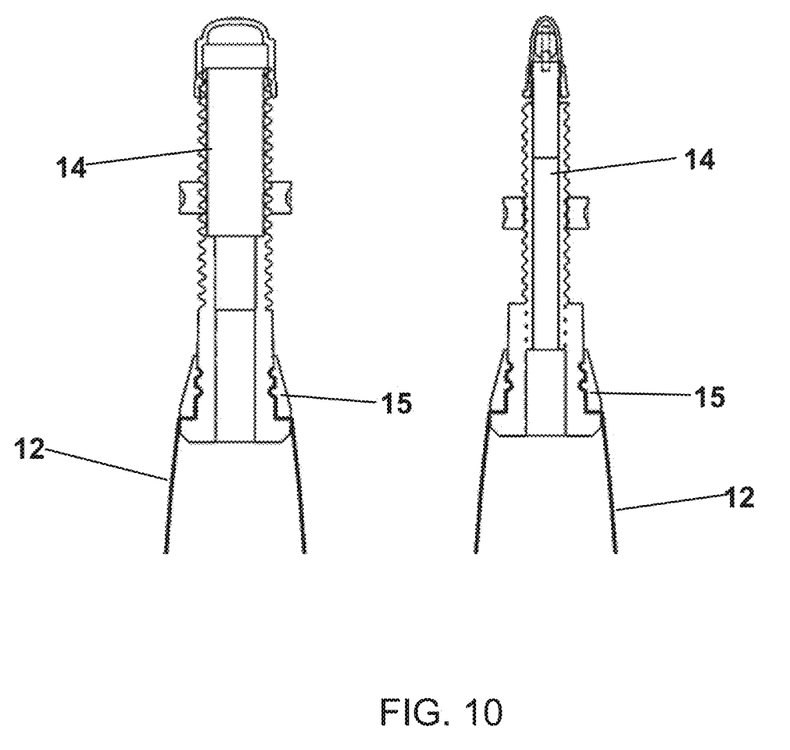
FIG. 10 schematically illustrates the region of valve connection to the balloon, Schrader valve—left, Presta valve—right.

Device 10 includes an elongated balloon 12 fitted with a bicycle tire valve 14 (Presta valve shown in FIGS. 1 and 10, Schrader valve shown in FIG. 2). Valve 14 is attached to an opening 16 in balloon 12 via an adhesive or welding or mechanical. Opening 16 can be at an end 18 of balloon 12 (as is shown in FIGS. 1-4 and 8) or a mid-portion 20 of balloon 12 (as is shown in FIGS. 5-7). Valve 14 can include indentations/grooves 15 that can enhance bonding of valve 14 to balloon 12 (FIG. 10). When fitted to an end 18 of balloon 12, valve 14 can be collinear with balloon 12 (FIGS. 1-3) or at an angle thereto (FIG. 4).

When attached to mid portion 20, valve 14 includes two inflation ports 22 (FIG. 6), each separately attached to a portion of balloon 12.

It will be appreciated that such a configuration of valve 14 can also be used to form an enclosed circular balloon 12.

Figure 3:
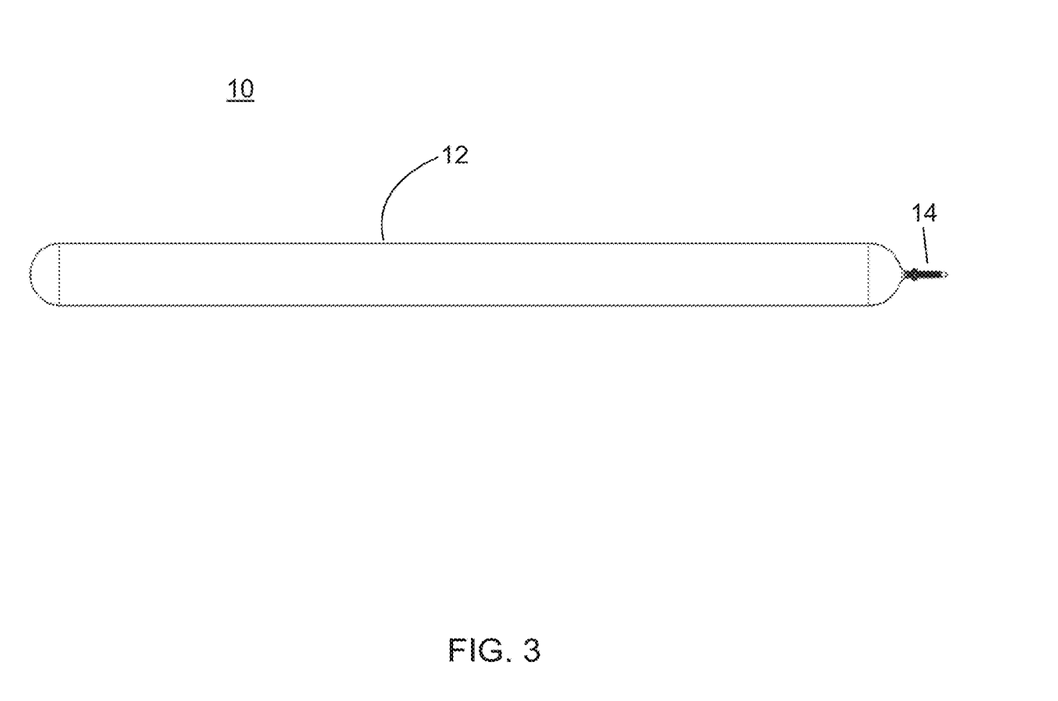
FIG. 3 illustrates an inflated out-of-tire state of one embodiment of the present device.
Figure 8:
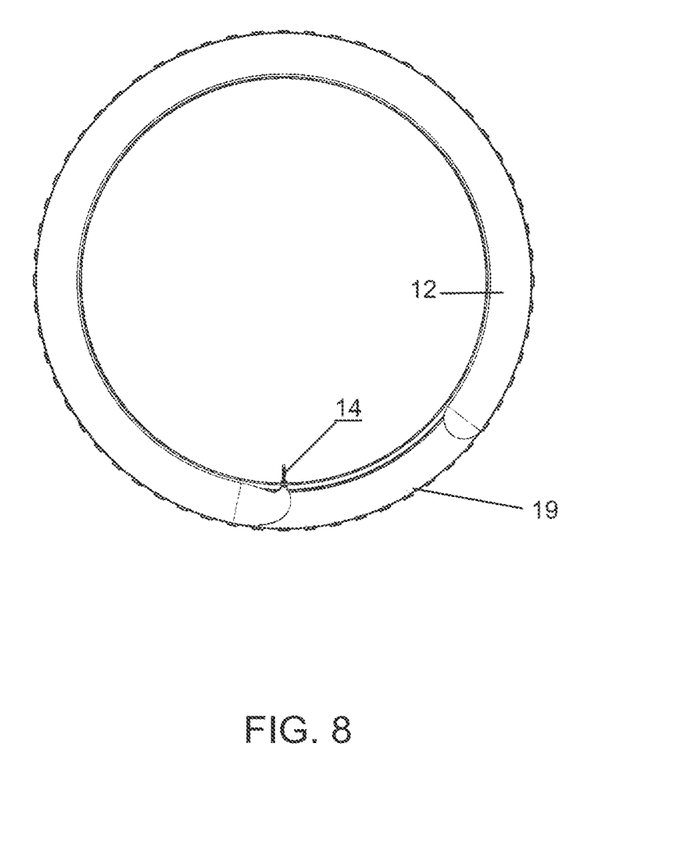
FIG. 8 is a cutaway drawing illustrating an inflated in-tire state of the device shown in FIG. 1.

When inflated outside of a bicycle tire, balloon 12 assumes a linear configuration (e.g., as is shown in FIG. 3). When inflated within a tire, balloon 12 follows the contour of the internal space between the tire and rim and forms a crescent shape (as is shown in FIGS. 4, 7 and 8).

Typical dimensions for balloon 12 can be 30-80 cm in length and 0.8-3 cm in average diameter (when deflated) with an average wall thickness of 0.2-0.8 mm, and 900-2300 cm in length and 3-12 cm in diameter when fully inflated to a pressure of 15-30 psi (prior to bursting). The average wall thickness prior to bursting can be 0.01-0.35 mm.

Balloon 12 geometry is of a rounded tube, closed at one side and tapering to 6-11 mm (conical) at the valve end (FIG. 10). The taper minimizes clogging of valve 14 by balloon 12 remnants following rupture.

The size and bursting pressure of balloon 12 can be matched with the tire mounted. For example, for gravel or road tires (typically 20-50 mm in with) a balloon 12 can be 1800 cm in length (when inflated) and 50 mm in diameter (when inflated). FIG. 8 illustrates device 10 mounted within an MTB tire 19; device 10 shown in an inflated state.

Balloon 12 can be fabricated from any elastic or semi elastic material, examples include latex, Silicone rubber and the like. The thickness and durometer of the material will depend on the expansion and desired burst pressure. For example, a balloon 450 mm in length, with a conical profile averaging 8-22 mm in diameter along 400 mm of its length fabricated from latex (with an elongation of 300-600%) having a wall 0.3-0.6 mm thick can inflate to 2000 mm length and 65 mm in diameter elongation 500-600% and burst at a pressure of 30 PSI. Balloon 12 can be fabricated using dip molding, extrusion, injection blow molding and the like.

Figure 11:
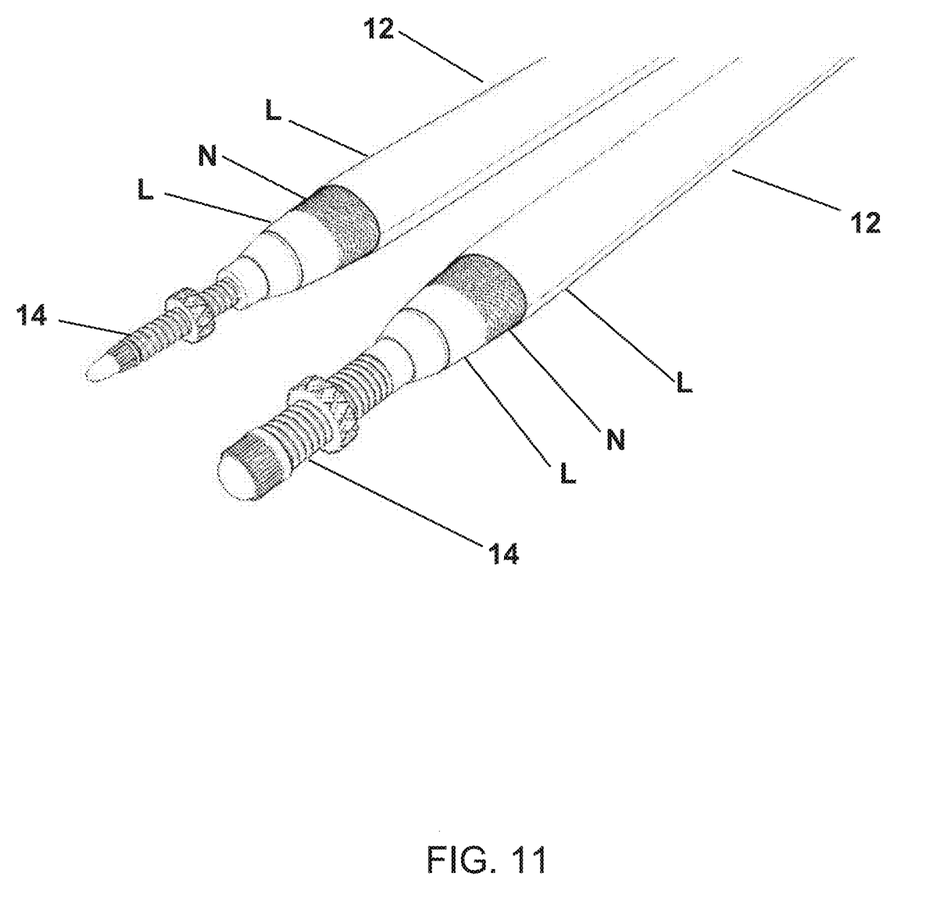
FIG. 11 illustrates a balloon having alternating latex (L), nylon mesh (N) and latex (L) layers fitted with a Schrader valve (left) and a Presta valve (right).

Balloon 12 can alternatively be fabricated from several layers in order to optimize balloon inflation and control radial inflation and elongation as well as the bursting pressure. One example of such construction can include alternating layers of an elastic material such as latex and a relatively inelastic mesh (e.g., nylon). A latex-nylon mesh-latex balloon 12 is shown in FIG. 11. The inelastic mesh restricts/minimizes balloon radial expansion while allowing elongation thereby ensuring that balloon 12 elongates along the tire circumference while maintaining radial expansion at a desired diameter.

Balloon 12 is relatively small and can burst into several pieces that do not negatively affect the performance of the wheel. However, since balloon 12 can be fabricated from a latex that can aid in puncture sealing, fragmentation of balloon 12 into smaller pieces can be advantageous.

Thus, a latex fragmenting/dissolving composition can be added to balloon 12 prior to tire mounting or within balloon 12. In the latter case, such a composition is preferably provided in an encapsulated form thereby enabling long term storage of device 10 without risking premature balloon 12 breakdown.

One composition that can be used for such purposes with balloon 12 is D-Limonene. D-Limonene dissolves latex but is generally unreactive with the vulcanized rubber of tires.

D-Limonene can be provided in an applicator (bottle, spray) as part of a kit that includes device 10 with instructions to apply to balloon 12 prior to use (tire mounting).

When provided within balloon 12, D-Limonene can be encapsulated within beads/small pouches that burst upon balloon 12 bursting.

D-Limonene can also be provided as a dry coating on balloon 12. Powder forms of D-Limonene are well known in the art and can be applied to the external surface of balloon 12 to act as both a dry lubricant and a latex dissolving agent (when reconstituted by the sealant released from balloon 12.

Alternatively, a sealant that can aid in balloon fragmentation (e.g., Joe's) can be added following mounting of the tire through the valve stem.

Device 10 can be used to mount any tubeless tire, when used to mount a bicycle tire, device 10 is used as follows.

A user mounts on side of the tire bead on a rim and positions balloon 12 of device 10 within the tire and valve 14 through the rim valve hole. In the case of separately provided lubricant, the other side of the tire is then mounted on the rim. The user then inflates the tire using a hand pump. As the tire inflates it elongates along the tire inner space to its final length and then expands radially. Radial expansion of balloon 12 pushes the tire bead against the rim. Further inflation bursts balloon 12 (at 15-40 PSI) and seats the bead against the rim inner flange. The user then continues to inflate until a desired pressure is reached (e.g., 30-40 PSI in MTB tires, 30-50 PSI in gravel tires and 80-120 PSI in road tires).

Valve 14 can include an extension with one or more side directed airway openings 17 (e.g., FIG. 6) or a cutout or hole in a side wall such that when balloon 12 bursts, balloon wall remnants do not block the valve.

While experimenting with prototypes (one shown in the Examples section that follows), the inventor discovered that in rare cases, inflation of balloon 12 within a tire led to premature balloon 12 bursting due to friction between the tire and balloon. To eliminate these rare occurrences, balloon 12 can be coated with a wet (e.g., silicone) or dry (e.g., corn starch) lubricant that can be provided on the balloon or a separate applicator (e.g., spray container) to be used prior to mounting.

When provide separately, the applicator and device 10 can form a part of a kit that also includes one or more sizes of balloon 12.

As is mentioned hereinabove, tubeless tire setups typically require use of a sealant to maintain tire-rim sealing and to plug punctures. In a typical tubeless tire setup, such a sealant is added directly into the tire-rim space prior to inflation, such a process requires a user to measure and pour the correct amount of sealant. During inflation of the tire, sealant can escape between the tire and rim leading to sealant loss which can foul the user and environment.

Device 10 can include a sealant within balloon 12. When balloon 12 bursts, the sealant is delivered into the tire-rim space without sealant loss or fouling. Depending on size, balloon 12 can include 30-120 ml of sealant.

Balloon 12 can include any type of sealant including latex-based sealants such as those used in products sold by Stan's™ or Joe's™ or Latex-free sealants such as those used in products sold by Orange Seal™.

As used herein the term "about" refers to±10%.

Additional objects, advantages, and novel features of the present invention will become apparent to one ordinarily skilled in the art upon examination of the following examples, which are not intended to be limiting.

EXAMPLES

Reference is now made to the following examples, which together with the above descriptions, illustrate the invention in a non-limiting fashion.

Example 1

Prototype Testing

A prototype device was constructed by gluing an open end of a party balloon to a Presta valve.

Figure 9A:
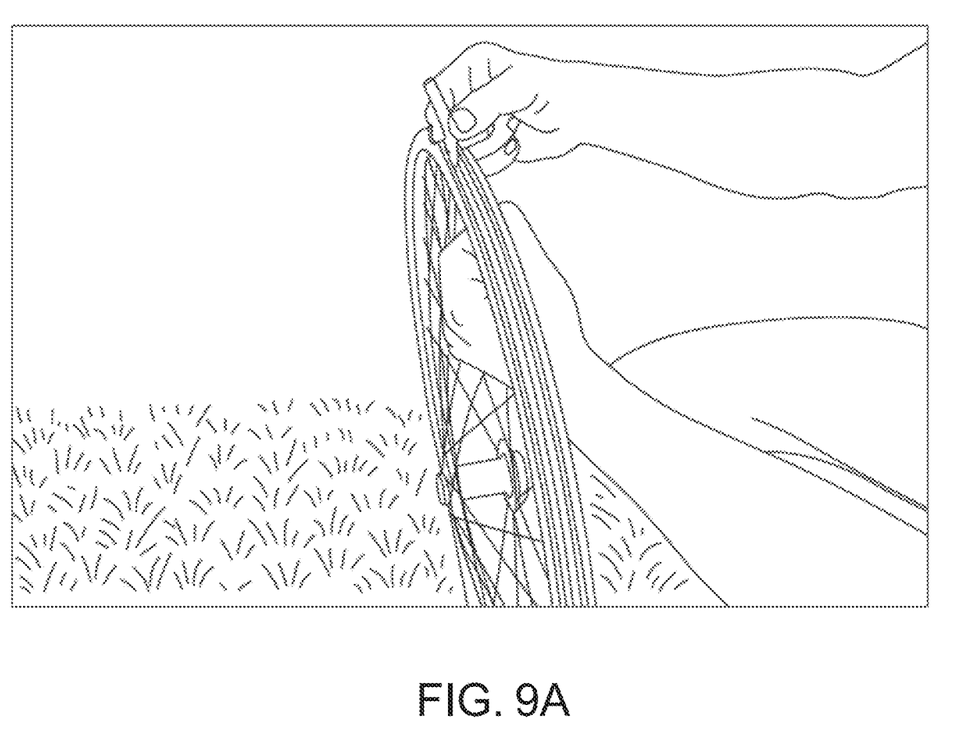
FIGS. 9A-C illustrate a prototype device and use thereof in mounting a tire.
Figure 9B:
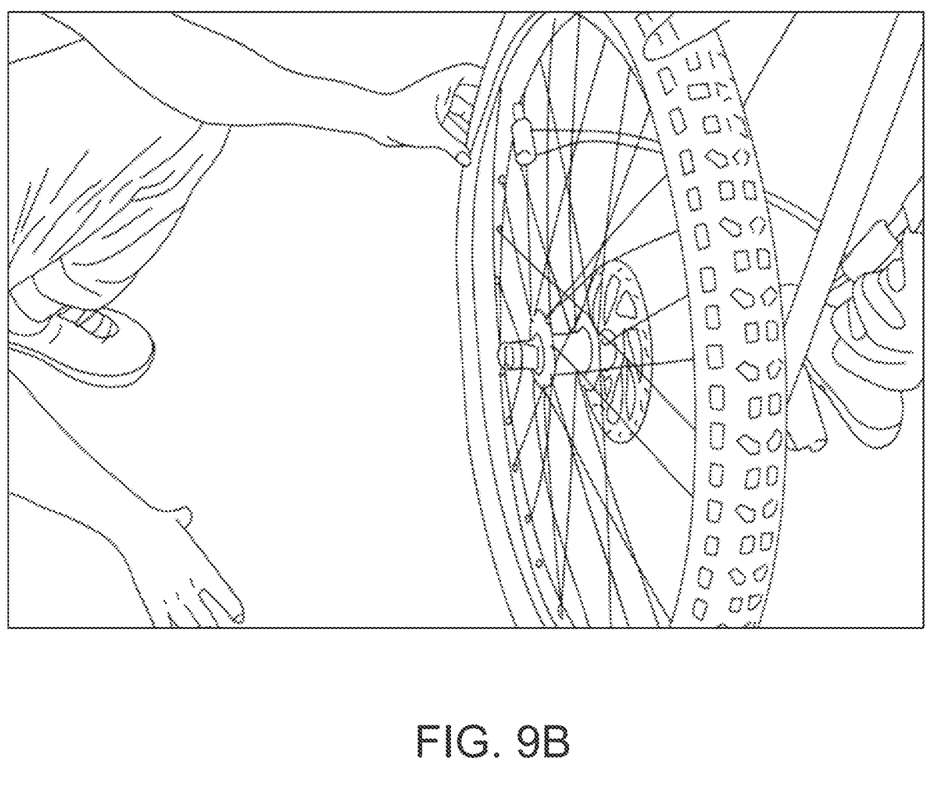
Figure 9C:
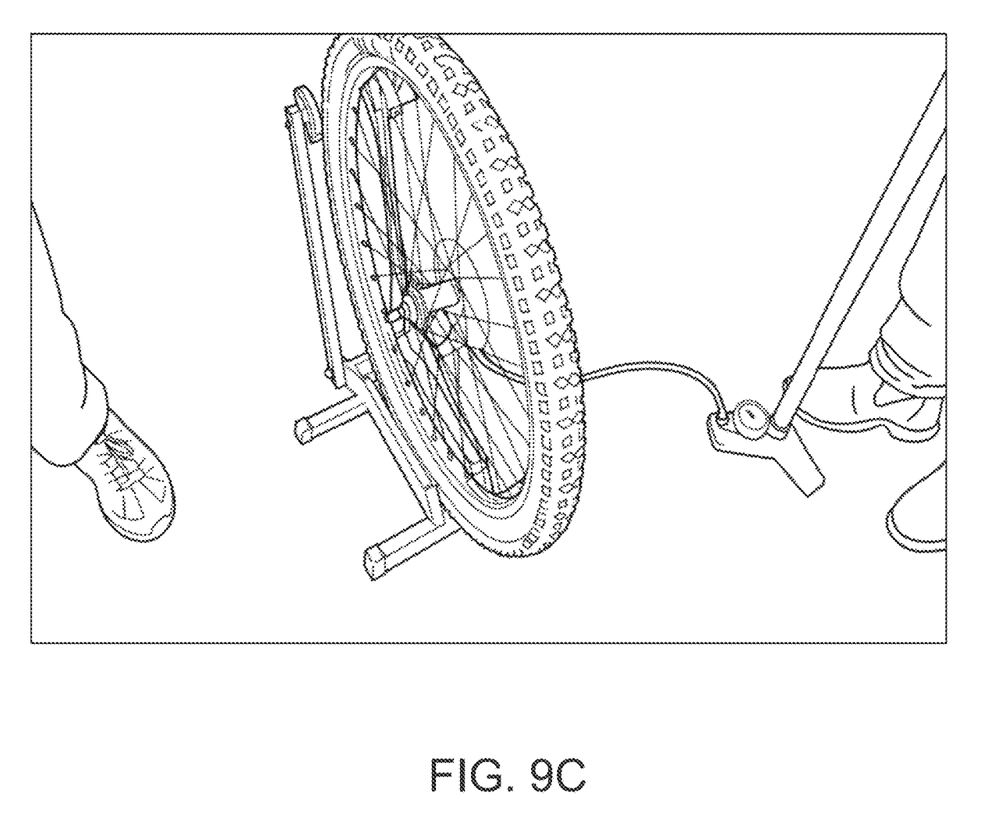

The prototype device was mounted on a 29" rim (FIG. 9A) by placing the valve stem in the valve hole of the rim. A tubeless-ready MTB tire was fitted on the rim (FIG. 9B) around the balloon of the device. The device was inflated using a floor pump (FIG. 9C) until bursting (at about 20-25 PSI as measured by the floor pump) thereby mounting the tubeless-ready tire on the rim. The floor pump was then used to bring the now mounted tire to a desired pressure. No leaks were observed for several days following mounting of the tire.

Example 2

Improved Prototype

While testing the prototype of Example 1 the present inventors noticed that in rare cases, the inflated balloon was trapped between the tire and rim and did not completely advance around the tire. Further inflation resulted in premature bursting of the balloon and although such bursting mounted in the tire in most cases, the present inventors sought out to prevent premature bursting.

While such a problem can be eliminated via lubricant (as mentioned hereinabove), the present inventors sought out a solution that would require lubrication.

The present inventors postulated that a balloon with less elasticity would elongate to its maximum length with radial expansion that would lead to trapping. To that end, the present inventors fabricated and tested balloons with an elasticity that produces 400-600% elongation before bursting.

The balloon, 450 mm in length (deflated), 12 mm in diameter (deflated), was fabricated using a dip molding process with vulcanization hardening. The balloon material included Latex (PVML60), Latex Hardener HF STIFFING, clay, nanoclay, water, GAPOLY and color.

The valve was glued to the open end of the balloon which was tapered 12 mm to 6 mm and a sealant fluid was added through the valve.

To optimize inflation and elongation, the wall thickness at the valve was approximately 0.3 mm lower than along the length of the balloon. To minimize valve clogging following bursting, a cone area approximately 30 mm in length near the valve connection and wall thickness of approximately 0.3 mm was used. The balloon was designed such that it covers 50% of the wheel circumference prior to bursting. Vulcanization was used in order to ensure that the tube is resistant to the sealant fluid.

Results showed that such balloons completely advanced through the tire prior to busting and that the problem of premature bursting was virtually eliminated.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. In addition, any priority document(s) of this application is/are hereby incorporated herein by reference in its/their entirety.

What is claimed is:

1. A device for mounting a tubeless tire comprising an elongated latex balloon having an opening attached to a bicycle tire valve, said balloon being configured for elongating and radially expanding when inflated within the tubeless tire to thereby push a bead of said tire against a rim and occupy at least 30% of a circumference of said tubeless tire prior to bursting, wherein the device includes a latex fragmenting/dissolving composition for fragmenting/dissolving said balloon following said bursting.

2. The device of claim 1, wherein said balloon is designed to burst at a pressure of 15-30 psi.

3. The device of claim 1, wherein said balloon is filled with a tire sealant composition.

4. The device of claim 3, wherein said balloon is covered with a lubricant.

5. The device of claim 4, wherein said lubricant is liquid silicone.

6. The device of claim 4, wherein said lubricant is a dry lubricant.

7. The device of claim 1, wherein said valve is a Presta valve.

8. The device of claim 1, wherein said latex fragmenting/dissolving composition is D-limonene.

9. The device of claim 8, wherein said D-limonene is encapsulated within said balloon.

10. A kit for mounting a tubeless tire comprising the device of claim 1 and an applicator containing a latex-disintegrating composition.

11. The kit of claim 10, wherein said latex-disintegrating composition includes D-limonene.

12. The kit of claim 10, wherein said applicator is a spray bottle.

13. A method of mounting a tubeless tire comprising:

(a) mounting the device of claim 1 between a tire and rim;

(b) inflating said balloon through said bicycle tire valve until said balloon bursts; and (c) continuing to inflate said tire through said valve until a desired pressure is reached.

\* \* \* \* \*